Asa Johnson.
Fastening sheet metal on Roofs.
No 17,331.    Patented May 19, 1857.
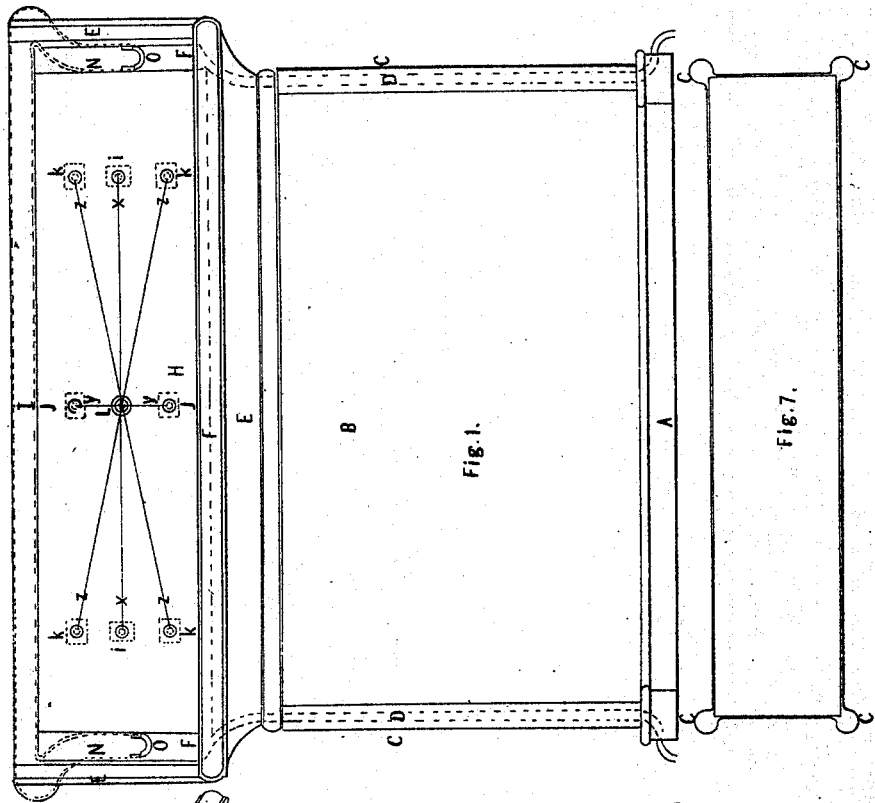
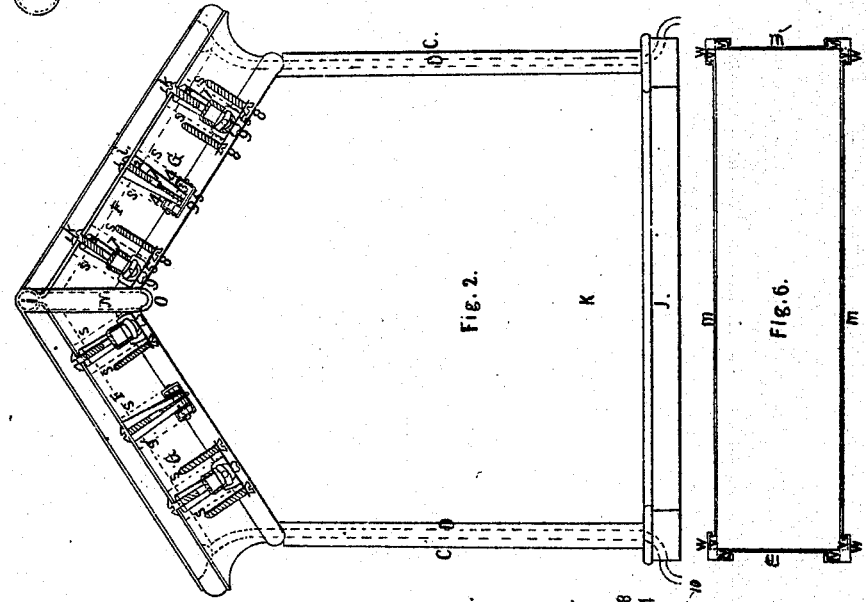
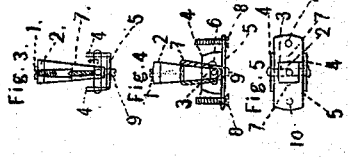

UNITED STATES PATENT OFFICE.

ASA JOHNSON, OF CAIRO, NEW YORK, ASSIGNOR TO JOHNSON, LINK & HIGBEE.

MODE OF FASTENING SHEET METAL ON ROOFS, &c.

Specification forming part of Letters Patent No. 17,331, dated May 19, 1857; Reissued April 16, 1872, No. 4,870.

*To all whom it may concern:*

Be it known that I, ASA JOHNSON, of the town of Cairo, county of Green, and State of New York. have invented a new and useful mode of self-adjusting fastenings for fastening metallic coverings to buildings and in any and all other places where metals require fastening and their contraction and expansion demand accommodation; and I do hereby declare that the following is a full, clear, and exact description of the same, reference being had to the accompanying drawings and to the letters of reference marked thereon, in which—

Figure 1 is a side elevation of a building. Fig. 2 is an end elevation or section cut through the roof in the line $x$ $x$ Fig. 1. Fig. 3 is an end elevation of the self-adjusting fastener. Fig. 4 is a side elevation of the same. Fig. 5 is a plan view of the bottom plate.

In Fig. 2, 5 is the bottom plate, $s$ $s$ screws, passing through said plate into the sheeting of the roof, $v$, through which a hole is bored; or, a hole may be bored where the substance is sufficiently thick, and the fastener let in from above and secured from the top side of the bottom plate. The vertical dotted lines mark the distance that the stud is allowed to play by the contraction and expansion of the metallic covering, 1 the screw for fastening the metallic covering to the adjustable stud 2, the india rubber cord passing through the stud, as seen at ($a$, $a$) and then through the plate 5, as seen at $g$, in Fig. 4.

In Fig. 3, 1 is the screw, 2 the stud, 4 the flanges, 5 the bottom plate, 3 the pin passing through the stud 2, and moving in the slots in the flanges 4 4, 7 the india rubber cord.

In Fig. 4, 1 is the screw, 2 the stud, 7 the india rubber cord, 4 the flange, 5 the bottom plate, 3 the pin, $s$, $s$ the screws for attaching the plate to the sheeting of the roof, as seen in Fig. 2.

In Fig. 5, 2 is the stud, 4 the flange, 7 the india rubber cord, (5) the bottom plate, 2 the hole through the bottom plate, for the cord to pass through.

In the operation of my invention, after sheeting the roof, if the boards do not exceed an inch in thickness or thereabout, I bore a hole at the point where I wish to insert the stud about the size as seen in vertical dotted lines in Fig. 2. The holes may be made larger or smaller, to allow for contraction and expansion so that the studs can move freely in any direction required. The bottom plate is then screwed firmly to the boards by the screws $s$, $s$, seen in Figs. 2, and 4, and the screw 1 passes through the metallic covering into the stud 2, thus firmly fastening the covering $k$, to the stud, as seen in Fig. 2. It will be further seen that the cord 7 passes through the stud 2, Fig. 4, and then through the bottom plate and is fastened together as at $g$, in said figure, thus always keeping the stud in an erect position, until attached to the metal.

If the covering contract, on a line parallel with the connecting pin $s$, the adjustable connecting stud 2, will move on it toward one of the flanges 4; when it expands, it will move toward the opposite flange, thus moving toward the point of contraction, and from the point of expansion, with the metallic covering.

The adjustable stud in addition to its parallel, and longitudinal movement, is capable also of a diagonal movement, thus accommodating itself to any direction required by the metal contracting or expanding.

I contemplate using them as general fasteners, where it is necessary to allow for the contraction and expansion of the material used, not confining myself to buildings only.

I may find, in using my adjustable fasteners, it necessary to make some of them, those that are on the parallel lines, with the flanges to fit up close to the sides of the studs, as seen at 11, in Fig. 2, allowing them to move in but one direction on the pin 3, which slides in the slots in the flanges 4, 4, as seen at 6, in red ink, in Fig. 4.

Having thus fully described the construction, and operation, of my invention, what I claim and desire to secure by Letters Patent, is,

The self-adjusting fastener as described for the purpose of attaching metallic coverings to buildings and accommodating itself to the contraction and expansion of the metal and for fastening metals in any and all other places where the contraction and expansion demand accommodation, substantially as set forth, or any mechanical device equivalent thereto.

ASA JOHNSON.

Witnesses:
WM. T. HALL,
GEORGE R. COMSTOCK.

[FIRST PRINTED 1912.]